United States Patent
Lonn et al.

(10) Patent No.: US 11,370,510 B2
(45) Date of Patent: Jun. 28, 2022

(54) REMOTELY CONTROLLED CONTAINER LOCK, SYSTEM AND METHOD

(71) Applicant: Lox Container Technology AB, Stockholm (SE)

(72) Inventors: Christoffer Lonn, Sundbyberg (SE); Andreas Nilsson, Gothenburg (SE)

(73) Assignee: Lox Container Technology AB, Stockholm (SE)

( * ) Notice: Subject to any disclaimer, the term of this patent is extended or adjusted under 35 U.S.C. 154(b) by 0 days.

(21) Appl. No.: 16/496,807

(22) PCT Filed: Sep. 27, 2018

(86) PCT No.: PCT/EP2018/057429
§ 371 (c)(1),
(2) Date: Sep. 23, 2019

(87) PCT Pub. No.: WO2018/172518
PCT Pub. Date: Sep. 27, 2018

(65) Prior Publication Data
US 2021/0101662 A1    Apr. 8, 2021

(30) Foreign Application Priority Data

Mar. 23, 2017  (SE) .................................. 1750348-3

(51) Int. Cl.
*B63B 25/00* (2006.01)
*B63B 25/28* (2006.01)
(Continued)

(52) U.S. Cl.
CPC ............ *B63B 25/004* (2013.01); *B63B 25/28* (2013.01); *B65D 55/10* (2013.01);
(Continued)

(58) Field of Classification Search
CPC ........ B65D 90/0013; B65D 2590/0083; B65D 90/00; B65G 63/045; B66C 1/663; Y10T 70/5031; Y10T 70/5009
(Continued)

(56) References Cited

U.S. PATENT DOCUMENTS 3,752,511 A * 8/1973 Racy ....................... F16B 21/02
24/287
6,974,164 B2 * 12/2005 Brewster ................... B60P 7/13
292/104
(Continued)

FOREIGN PATENT DOCUMENTS

CN          10175915 A    6/2010
CN          105775459 A   7/2016
(Continued)

OTHER PUBLICATIONS

Chinese First Office Action Issued from the China National Intellectual Property Administration, in the Corresponding CN Patent Application No. 2018800189448 dated Aug. 19, 2020, 10 pages.
(Continued)

*Primary Examiner* — Nam V Nguyen
(74) *Attorney, Agent, or Firm* — Schott P.C.

(57) ABSTRACT

Method, container corner lock and system for fastening a first container corner casting of a first container and a corresponding second container corner casting of a second container. The first container is stacked on the second container. The container corner lock includes: a first protruding part; including a first locking for fixing the first protruding part into the first recess; a second protruding part, including a second locking for fixing the second protruding part into the second recess; an electric motor configured to block or unblock the movement of at least one of the locking means; a first wireless transceiver; a processing circuit configured to receive the signal from the wireless transceiver
(Continued)

and generate a command for operating the electric motor and a second wireless transceiver or transponder with a shorter range than said first wireless transceiver.

17 Claims, 7 Drawing Sheets

(51) Int. Cl.
*B65D 55/10* (2006.01)
*B65D 90/00* (2006.01)
*E05B 47/00* (2006.01)
*G06K 19/07* (2006.01)
*G07C 9/00* (2020.01)

(52) U.S. Cl.
CPC ...... *B65D 90/0026* (2013.01); *E05B 47/0012* (2013.01); *G06K 19/0724* (2013.01); *G07C 9/00896* (2013.01); *B63B 2025/285* (2013.01); *B65D 2203/10* (2013.01); *B65D 2313/00* (2013.01); *B65D 2590/0083* (2013.01); *E05B 2047/0094* (2013.01); *G07C 2009/0092* (2013.01); *G07C 2009/00769* (2013.01)

(58) Field of Classification Search
USPC ............ 340/5.7, 5.73, 10.1 to, 10.5; 410/77
See application file for complete search history.

(56) References Cited

U.S. PATENT DOCUMENTS

| | | | | |
|---|---|---|---|---|
| 7,014,234 B2* | 3/2006 | Walker | ................. | B65D 88/022 220/1.5 |
| 7,056,081 B2* | 6/2006 | Kelly | ................... | B65D 88/022 220/1.5 |
| 7,114,898 B2* | 10/2006 | Brewster | ................. | B60P 7/132 410/70 |
| 7,621,414 B2* | 11/2009 | Bederke | ............. | B65D 90/0013 206/512 |
| 7,942,601 B2* | 5/2011 | Bohman | ............ | B65D 90/0013 403/343 |
| 7,987,017 B2* | 7/2011 | Buzzoni | ................ | B66C 19/002 700/213 |
| 8,228,185 B2* | 7/2012 | Tryggo | .............. | B65D 90/0013 340/539.1 |
| 8,342,786 B2* | 1/2013 | Kelly | ........................ | B60P 7/13 410/84 |
| 8,458,861 B2* | 6/2013 | Ostberg | .................. | B60P 7/132 24/287 |
| 8,684,644 B2* | 4/2014 | Metternich | ............. | B60P 7/132 410/77 |
| 9,359,129 B1* | 6/2016 | Royt | .................... | B65D 90/0013 |
| 9,809,358 B2* | 11/2017 | Lanigan, Sr. | ...... | B65D 21/0209 |
| 10,717,595 B2* | 7/2020 | Omre | .................. | B65D 90/0013 |
| 2003/0041421 A1 | 3/2003 | Reynard | | |
| 2006/0250235 A1* | 11/2006 | Astrin | ..................... | G08B 25/10 340/539.22 |
| 2008/0193246 A1 | 8/2008 | Bohman et al. | | |
| 2010/0171597 A1 | 7/2010 | Tryggo | | |
| 2011/0025459 A1* | 2/2011 | Denison | ................ | G07F 7/1025 340/5.51 |
| 2015/0284182 A1 | 10/2015 | Kelly | | |
| 2016/0270527 A1* | 9/2016 | Winter | ...................... | B62B 5/00 |
| 2018/0093814 A1* | 4/2018 | Espinosa | .................. | A23L 3/01 |

FOREIGN PATENT DOCUMENTS

| | | |
|---|---|---|
| JP | 2005528278 A | 9/2005 |
| JP | 2006161302 A | 6/2006 |
| JP | 2007231615 A | 9/2007 |
| JP | 4663650 A | 4/2011 |
| JP | 2015026874 A | 2/2015 |
| JP | 2015166202 A | 9/2015 |
| KR | 10-2006-0114678 A | 10/2006 |
| WO | 2005048206 A1 | 5/2005 |
| WO | 20151919313 A1 | 12/2005 |
| WO | 2013033769 A1 | 3/2013 |

OTHER PUBLICATIONS

Notice of Reasons for Refusal Issued from the Japanese Patent Office within the Japanese Application No. 2019-551538, dated May 13, 2021, 6 pages (Machine Translation Provided as NPL2).
Machine Translation for Notice of Reasons for Refusal Issued from the Japanese Patent Office within the Japanese Application No. 2019-551538, dated May 13, 2021, 6 pages.
International Search Report and Written Opinion for PCT/EP2018/057429, dated May 14, 2018.
Notification of Second Office Action Issued from China National Intellectual Property Administration within the Chinese Application No. 2018800189448, dated Jan. 25, 2021, 6 pages.
Quora online, Reply to "What is the maximum distance for NFC communication?", Apr. 30, 2016, [Sep. 14, 2020. Search], Internet— URL:https://www.quora.com/What-is-the-maximum-distance-for-NFC-communication, 2 pages.

* cited by examiner

REMOTELY CONTROLLED CONTAINER LOCK, SYSTEM AND METHOD

TECHNICAL FIELD

This document discloses a method, a container corner lock, and a system. More particularly, a method, a container corner lock, and a system are disclosed for fastening a first container corner casting of a first container and a corresponding second container corner casting of a second container, wherein the first container is stacked on the second container.

BACKGROUND

When transporting goods over long distances on ships, rail and sometimes on truck, containers are typically used. These containers may be referred to as intermodal containers, shipping containers and/or ISO containers. ISO is an abbreviation for International Organisation for Standardisation, which has determined a globally accepted standardised dimensions of the shipping containers of the discussed type.

The containers are made of steel. They can be loaded and unloaded, stacked, transported efficiently over long distances, and transferred from one mode of transport to another, e.g. container ships, rail transport flatcars, and semi-trailer trucks, without being opened. All containers are numbered with a unique identification number and may be tracked using computerised systems.

Stacking and anchoring the containers in a safe way, also during shipping in rough seas, is possible thanks to standardised corner castings at each corner of the containers. A container corner lock may be inserted and fixed into a respective recess of each corner casting under a container when it has been lifted from the ground, e.g. on a quay. The container may then be lifted with a crane (or forklift truck) and placed on top of another container on-board the ship. Each container corner lock of each respective corner underneath the on top container is then fitted into a recess of the respective standardised corner casting on the roof of the lower container. Then, an operator has to lock/unlock the container corner lock also into the lower container, by climbing up a lashing bridge, using a long stick or similar instrument, or by traveling in a cage attached to the spreader, to reach the upper container tiers.

In case the containers are not locked into each other in a satisfactory way, sever accidents may occur, leading to lost containers and/or even shipwrecking, in rough seas Containers may be stacked on each other in the above described manner up to nine containers on top of each other on a container ship. Each container typically has a height of eight foot, corresponding to approximately 2.4 meters. When the operator is fixing the uppermost container he/she thus has to climb, or be elevated in a crane or similar, about 19.2 meters up over the deck in the wet, windy and swaying conditions which typically are occurring on a ship.

This process is obviously dangerous for the operator performing the locking/unlocking of the container corner locks. Several severe accidents occur every year, unfortunately sometimes with lethal result.

Further, the process of locking/unlocking the container corner lock is time consuming and thereby costly for the ship-owner, firstly as a plurality of operators has to be hired and secondly as it prolongs the time the ship has to spend in port, which generates harbour dues and prolongs the delivery of the containers/goods.

Yet another problem with the existing container corner locks is that it is difficult for the captain to verify and confirm that all container corner locks of the containers on-board have been successfully locked. A container ship may comprise more than 19 000 20-foot equivalent units (TEU). However, containers stored under deck, which may be about 50% of all containers on-board, are normally not locked. Further, about 75% of all containers are 40-foot containers. Thus a 19 000 TEU may comprise about 24 000 locks.

It is not practically possible for the captain to double-check and thereby verify that all 24 000 container corner locks on-board are correctly locked, without exceptional time delays. For example, if the captain spends on average one minute checking each container corner lock, which is rather optimistic, and he/she works 24/7, it would take about 17 days to verify that all 24 000 container corner locks are locked. Instead the captain has to rely on the accuracy of the operator, which is hazardous, as the consequence of one single unlocked container corner lock may be devastating for the ship. Alternatively, random checks may be made.

Due to the rough conditions in a maritime environment, the container corner locks sometimes malfunction due to corrosion, dirt, mechanical impact, lack of lubrication/maintenance etc. For this reason, and because a malfunctioning container lock may lead to sever security consequences on-board, classification societies (i.e. organisations that establish and maintain technical standards for constructions/operations of ships and offshore structures) have established a requirement on the ship-owner to maintain each individual container corner lock at a regular time interval. Insurance companies may also put such requirement on the ship-owner.

Currently, there is no practical way of ascertaining that a container corner lock maintenance scheme is actually adhered to.

It is desirable to improve the security of people, cargo and vessels when containers are transported.

SUMMARY

It is therefore an object of this invention to solve at least some of the above problems and improve security during the transportation of containers.

According to a first aspect of the invention, this objective is achieved by a container corner lock for fastening a first container corner casting of a first container and a corresponding second container corner casting of a second container, wherein the first container is stacked on the second container. The container corner lock comprises a first protruding part, configured to be inserted into a first recess of the first container corner casting of the first container; wherein the first protruding part comprises a first locking means for fixing the first protruding part into the first recess. Further, the container corner lock also comprises a second protruding part, configured to be inserted into a second recess of the second container corner casting of the second container; wherein the second protruding part comprises a second locking means for fixing the second protruding part into the second recess. The container corner lock furthermore comprises an electric motor configured to block or unblock the movement of at least one of the locking means between an open position and a locked position within the corresponding recess. In further addition, the container corner lock comprises two wireless transceivers each configured to receive/transmit a wireless signal. The container corner lock further comprises a processing circuit configured to receive the signal from the wireless transceivers, interpret the signal and generate a command for operating the electric motor in accordance with the received wireless signal and to confirm performed actions back through means of an acknowledgement signal to the transceiver.

According to a second aspect of the invention, this objective is achieved by a system for fastening a first container, stacked on top of a second container. The system comprises a set of container corner locks according to the first aspect, associated with the first container. Further, the system also comprises at least one transceiver, which transceiver is configured to communicate wireless signals with the respective transceivers of the set of container corner locks. The system furthermore comprises a processing unit, configured to interpret wireless signals obtained from the set of container corner locks via the transceiver, into information. Additionally, the system also comprises a database configured to store obtained information related to the set of container corner locks. The system further comprises an output unit configured to output obtained information related to the set of container corner locks to an operator.

According to a third aspect of the invention, this objective is achieved by a method for stacking and fastening a first container on top of a second container. The method comprises the steps of fixing a first protruding part of a container corner lock according to the first aspect in a respective recess of each container corner casting underneath the first container. The method further comprises the step of obtaining a unique identity reference of each of the container corner locks fixed in the container corner castings underneath the first container. In addition, the method furthermore also comprises the step of associating the obtained unique identity references of the container corner locks with a unique identity reference of the first container. Further, the method also comprises storing the obtained unique identity references of the container corner locks associated with the unique identity reference of the first container in a database. Also, the method further comprises stacking the first container on top of the second container, wherein a second protruding part of each respective container corner lock is inserted into a respective recess at each container corner casting at the top of the second container. The method additionally comprises the step of locking the container corner locks into the container corner castings at the top of the second container, either by remotely operating an electric motor of each container corner lock via a wireless signal transmitted from a processor via a transceiver; or, in cases where the second locking means comprises a spring-loaded self-locking mechanism, the locking of the container corner locks into the container corner castings may be made by inserting the respective second protruding part of the container corner castings into the second recess of the second container corner casting of the second container to activate the spring-loaded self-locking mechanism.

Hereby, thanks to the disclosed aspects, by inserting a remotely controlled electric motor for relocating at least one of the locking means between an open position and a locked position within the corresponding container corner recess, it thereby becomes possible to remotely control the container corner locks associated with a certain container when it is to be loaded/off loaded.

Thereby, a lot of dangerous and time consuming manual work, requiring operators to climb up stacked containers is omitted, making the loading/unloading of containers considerably faster, safer and cheaper.

Other advantages and additional novel features will become apparent from the subsequent detailed description.

BRIEF DESCRIPTION OF THE FIGURES

Embodiments of the invention will now be described in further detail with reference to the accompanying figures, in which.

DETAILED DESCRIPTION

Embodiments of the invention described herein are defined as a container corner lock, a system and a method, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
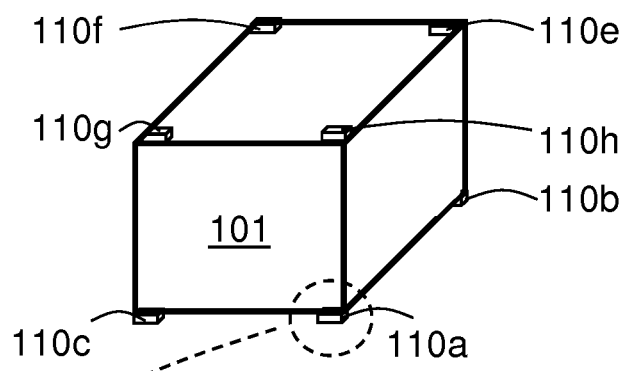
FIG. 1 illustrates a container, and a container corner casting, according to an embodiment of the present invention.

FIG. 1 illustrates a container 101 for transporting goods, e.g. on a ship or on another vehicle. The container 101 may be a standardised ISO container being 20 foot or 40 foot or 45 foot long; 8 foot wide and 8.6 or 9.6 foot high.

However, the container 101 may have any arbitrary other dimensions in other embodiments, such as e.g. 48 foot or 53 foot long or 10 foot, 8 foot, 6 foot, 4 foot long, etc.

The container 101 may be loaded and unloaded, stacked, transported efficiently over long distances, and transferred from one mode of transport to another; container ships, rail transport flatcars, and semi-trailer trucks or other similar vessels; without being opened. The handling may be done with cranes and/or special forklift trucks. The container 101 may further be marked with a unique identification code (ISO 6346), sometimes referred to as a BIC (International Container Bureau) code. The code may comprise a unique serial number (with check digit), the owner, a country code, a size, type and equipment category as well as any operational marks, for uniquely identifying the container 101.

Intermodal containers 101 share a number of key construction features to withstand the stresses of intermodal shipping, to facilitate their handling and to allow stacking such as e.g. corner castings 110.

Each corner of the container 101 has a corner casting 110, typically having a standardised size of 180×180×110 mm (although other arbitrary dimensions may function as well). Corner casting dimensions and tolerances are described in the standard ISO 1161. The corner casting 110 is fitted into the container 101. The corner casting 110 may not comprise any moving parts, but has an oval recess 115 in the top/bottom. The recess 115 is preferably a flattened oval, or rectangle with rounded ends, for example 4.9 in (124.5 mm) on the long axis with two flat sides 2.5 in (63.5 mm) apart.

A container corner lock may be inserted into the oval recess 115 of the corner casting 110, for connecting two containers with each other, when they are stapled one on top of the other. The container corner lock will be further discussed and presented in FIGS. 2A-2C.

The corner castings 110 may also comprise one or more lateral oval holes or rectangular holes with rounded ends, which may be utilised for connecting two containers with each other in lateral directions, in an embodiment of the invention.

Figure 2A:
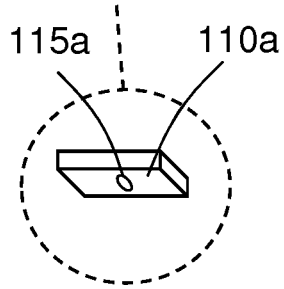
FIG. 2A illustrates a container corner lock, according to an embodiment of the present invention.
Figure 2A:
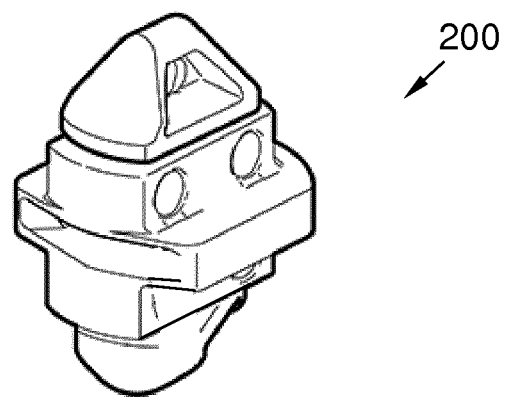

FIG. 2A discloses a container corner lock 200 in accordance with one embodiment of the present invention. The container corner lock 200 is remotely controlled, i.e. the container corner lock 200 may be locked/unlocked remotely via a wireless communication interface. The container corner lock 200 comprises an antenna and a wireless transceiver. Further, the container corner lock 200 also comprises an electric motor configured to lock/unlock a locking mechanism of the container corner lock 200. These described actions may be controlled by a processing circuit, e.g. a microprocessor, positioned inside the container corner lock 200.

The container corner lock 200 may be made of steel, e.g. a hardened steel alloy and preferably may comprise a galvanised coating, in order to resist or at least obstruct oxidation.

The container corner lock 200 may be inserted in a recess 115a of a container corner casting 110a of a first container 101 and also, at the other end, be inserted in the corresponding recess of a container corner casting of a second container 102. Thereby, the containers 101, 102 may be connected, and a stack of containers 101, 102 may be stabilised.

Figure 2B:
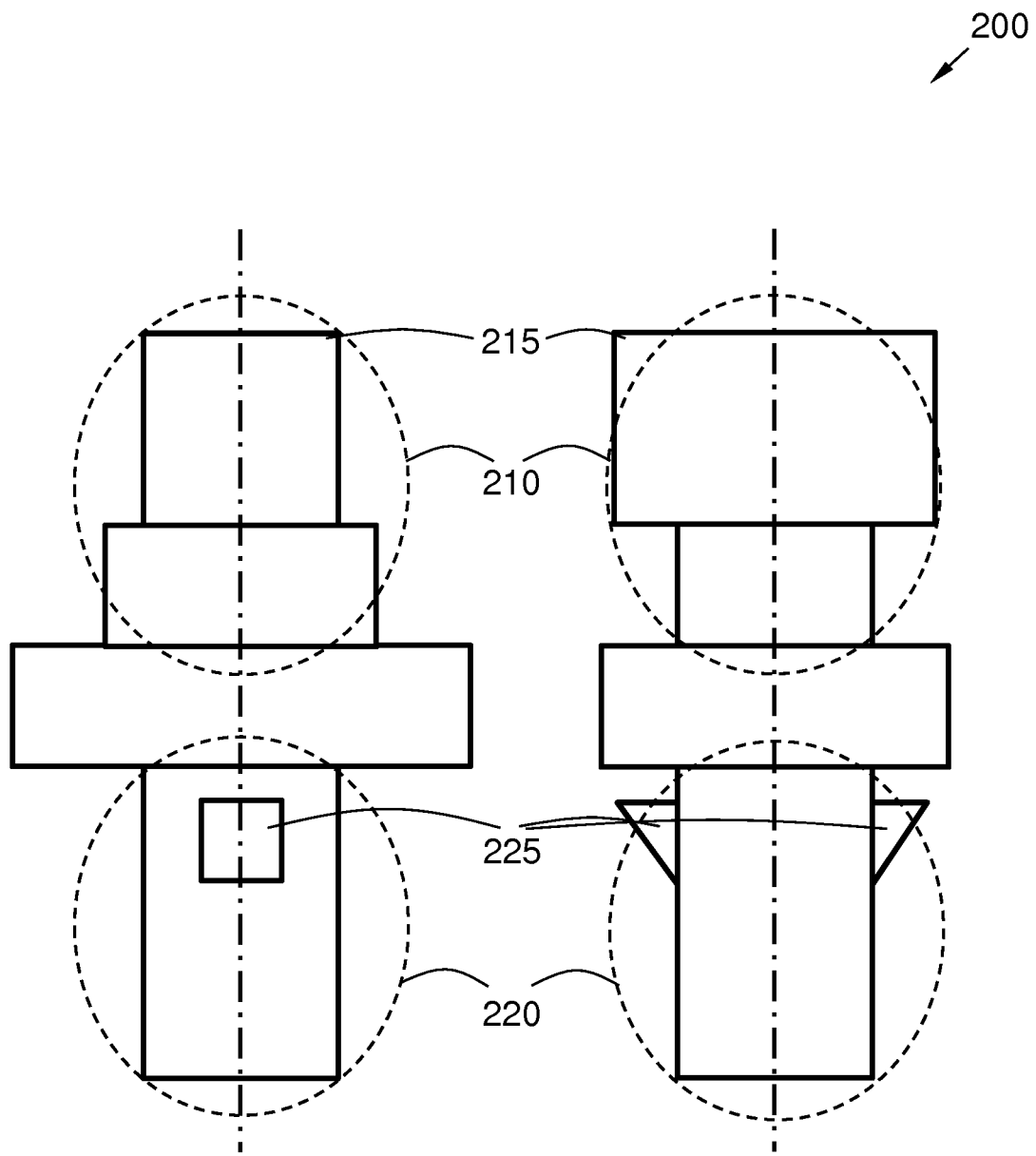
FIG. 2B illustrates a two-side-views of a container corner lock according to an embodiment of the present invention.

FIG. 2B shows schematically lateral views of a container corner lock 200. The container corner lock 200 comprises a first protruding part 210 and a second protruding part 220. The first protruding part 210 may comprise a first locking means 215 while the second protruding part 220 may comprise a second locking means 225.

The first protruding part 210 is configured to be inserted into a first recess 115a of a first container corner casting 110a of the first container 101. The first locking means 215 of the first protruding part 210 is configured for fixing the first protruding part 210 of the container corner lock 200 into the first recess 115a of the first container corner casting 110a.

The second protruding part 220 is configured to be inserted into a second recess of a second container corner casting of a second container. The second locking means 225 of the second protruding part 220 is configured for fixing the second protruding part 220 of the container corner lock 200 into the second recess of the second container corner casting.

The first locking means 215 of the first protruding part 210 in the illustrated embodiment may be configured for manual locking for fixing the first protruding part 210 into the first recess 115a of the first container corner casting 110a. Thereby a stevedore may easily fix the container corner lock 200 into the recess 115a of the first container corner casting 110a of the first container 101, when it is raised above the ground at the quay/deck.

A stevedore, sometimes also referred to as a dockworker, docker or longshoreman is a waterfront manual labourer who is involved in loading and unloading ships.

The second locking means 225 comprises a spring-loaded mechanism for fixing the second protruding part 220 of the container corner lock 200 into the second container corner casting 120a when inserted into the second recess 125a of the second container corner casting 120a of the second container. The spring-loaded mechanism may be self-locking or not self-locking in two different embodiments of the invention. The spring-loaded mechanism may be locked by remotely operating an electric motor of each respective container corner lock 200 via a wireless signal transmitted from a processor/crane control unit via a transceiver in some embodiments.

When the second locking means 225 is set into the locked position, in preferred embodiments of the invention, a locking pin or the like (not shown) is rotated and thereby fixes the container corner lock 200 in the container corner casting 120a. Thus, the rotational position of the locking pin indicates whether the second locking means 225 is set in the open position or locked position. When the locking pin has been rotated to set the second locking means 225 into the open position, the second locking means 225 is enabled to move and open, otherwise the locking pin blocks any movement of the second locking means 225.

Figure 2C:
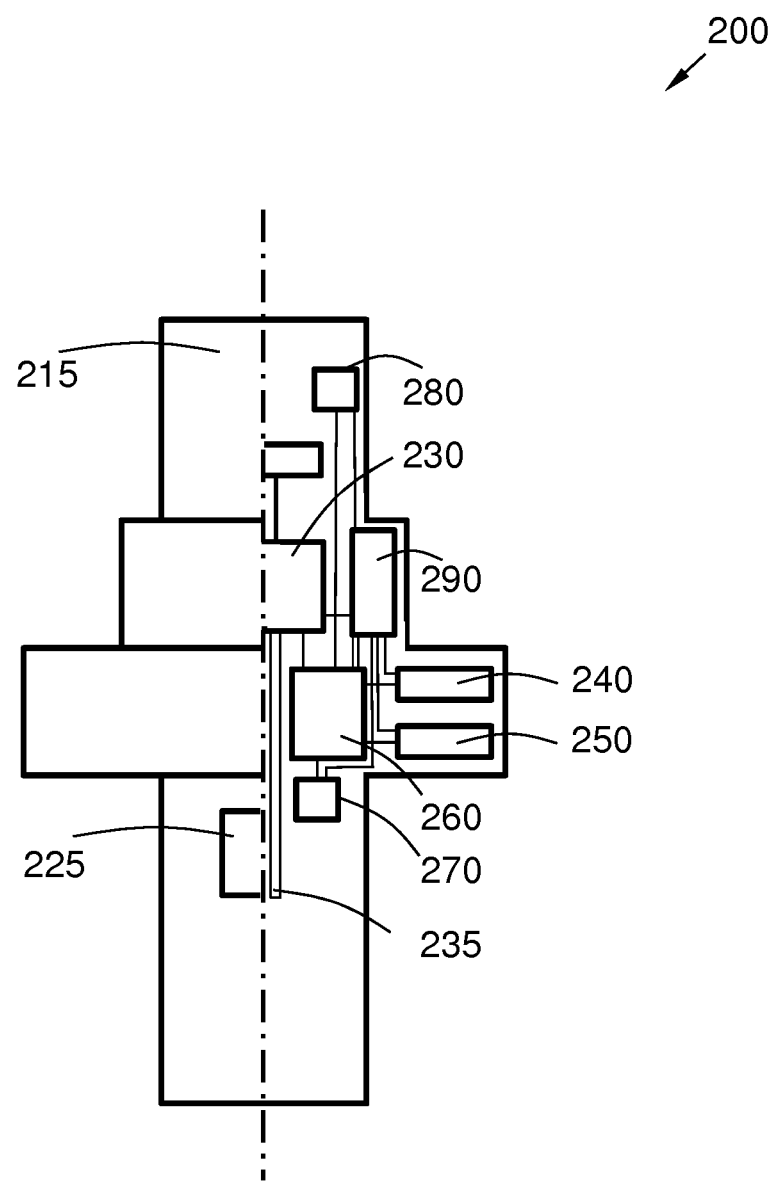
FIG. 2C illustrates a cross section of a container corner lock according to an embodiment of the present invention.

FIG. 2C discloses a schematic cross section view of a container corner lock 200, according to another embodiment of the invention.

The container corner lock 200 comprises an electric motor 230. The electric motor 230 may be configured to relocate at least one of the locking means 215, 225 between an open position and a locked position within the corresponding recess 115a, 120a, in some embodiments. In preferred embodiments, the electric motor 230 may be configured to relocate the second locking means 225 from the locked position into the open position; and/or vice versa. The container corner lock 200 may comprise a locking pin 235 and in such cases, preferably, the electric motor 230 may relocate, for example by rotation, the locking pin 235, thereby setting the locking means 215, 225 into the open position and/or into the locked position, respectively within the corresponding recess 115a, 120a. The electric motor may be a DC motor 230.

In another embodiment of the invention, when the second locking means 225 is set into locked position, the locking pin 235 may be rotated by the electric motor 230, thereby fixing the container corner lock 200 in the container corner casting 120a. Thus, when the locking pin 235 has been rotated to set the second locking means 225 into the open position, the second locking means 225 is enabled to move and open, otherwise the locking pin 235 blocks any movement of the second locking means 225, in some embodiments.

Additionally, the container corner lock 200 in accordance with the present invention comprises a wireless transceiver

240. The wireless transceiver 240 may be configured to receive a wireless signal from a remote transceiver, e.g. in a crane.

The wireless communication may be made over a wireless interface comprising, or at least being inspired by radio access technologies such as e.g. ZigBee (standard IEEE 802.15.4), Z-wave, or any other Wireless Personal Area Networks (WPANs) such as Wi-Fi, Bluetooth etc. However, the wireless communication may in some embodiments be made over any other wireless communication such as e.g. 3GPP LTE, LTE-Advanced, E-UTRAN, UMTS, GSM, GSM/EDGE, WCDMA, Time Division Multiple Access (TDMA) networks, Frequency Division Multiple Access (FDMA) networks, Orthogonal FDMA (OFDMA) networks, SingleCarrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1× RTT and High Rate Packet Data (HRPD), or similar, just to mention some few options, via a wireless communication network.

As the transportation vessel typically acts on an international and/or global arena, wherein different legislations have applied different restrictions concerning which radio frequencies to allow for usage in the present context, it is an advantage to use radio communication that is free to be used in all, or at least most legislations, such as: 13.56 MHz (for NFC), 2400-2483.5 MHz, and/or 5725-5875 MHz. Usually the maximum authorised transmission power for such frequencies is limited by individual countries and may be, for example, 10 mW or 25 mW.

It is also an advantage to transmit radio signals with limited effect, in order to not drain the battery lifetime of the energy source of the container corner lock 200 and to minimise interference in embodiments wherein the wireless transceiver 240 is configured to also send a radio signal to the transceiver in the crane. Preferably the power of the container lock transmitter is restricted to being equal to or less than 10 mW, more preferably less than or equal to 5 mW and most preferably equal to or less than 2.8 mW. This is adequate for a range of 10-50 m.

The container corner lock 200 comprises a second wireless transceiver or transponder which is a short-range wireless transceiver or transponder 250. The short-range wireless transceiver or transponder 250 is configured to provide a unique identity reference of the container corner lock 200 to a short-range wireless terminal upon request. Such a short-range terminal can be carried by an operator in close proximity to the container lock. Thereby, a stevedore or similar person may extract the identity of the container corner lock 200 when mounting the container corner lock 200 on a container 101.

The short-range wireless terminal may communicate with the short-range wireless transceiver or transponder 250 of the container corner lock 200 via a short-range wireless communication interface such as e.g. Near Field Communication (NFC) (13.56 MHz according to standard IEEE 802.15.4), or any other Wireless Personal Area Networks (WPANs) such as Wi-Fi, Wireless Local Area Network (WLAN), Ultra Mobile Broadband (UMB), Bluetooth (BT), Radio-Frequency Identification (RFID), Z-wave, ZigBee, IPv6 over Low power Wireless Personal Area Networks (6LoWPAN), Wireless Highway Addressable Remote Transducer (HART) Protocol, Wireless Universal Serial Bus (USB), Alternatively or additionally, optical communication such as Infrared Data Association (IrDA) or infrared transmission to name but a few possible examples of wireless communications may be used in some embodiments of the invention.

In some alternative embodiments, the short-range wireless transceiver or transponder of the container corner locks 200 may comprise an NFC tag comprising the unique identity reference of the container corner lock 200, while the short-range wireless terminal may comprise an NFC reader. Such NFC tag may be active or passive.

In passive mode, the initiator NFC reader provides a carrier field and the NFC tag answers by modulating the existing field. In this mode, the NFC tag may draw its operating power from the initiator-provided electromagnetic field, thus making the NFC tag a transponder.

In active mode, both the NFC tag and the NFC reader communicate by alternately generating their own fields. A device deactivates its radio frequency field while it is waiting for data. In this mode, both devices typically have power supplies. Unlike a barcode, the NFC tag need not be within the line of sight of the reader, so it may be embedded in the container corner lock 200.

Additionally, the identification of the respective container corner locks 200 may be made by a barcode, such as a linear bar code like European Article Number (EAN), or a matrix code such as e.g. a Quick Response (QR) code, in combination with a bar code reader of the short-range wireless terminal.

The unique identity reference of the container corner lock 200 may in some embodiments comprise a Media Access Control (MAC) address or Central Processing Unit (CPU) serial number of a processor comprised in the container corner lock 200. The unique identity reference of the container corner lock 200 may also be a non-repeatable random number or manufacturing number stored in a memory of the container corner lock 200 in some embodiments.

Alternatively, or additionally, the container corner lock 200 may have the unique identification written on the exterior and the short-range wireless terminal may comprise a camera and image recognition program for detecting and interpreting the unique identification code of the container corner lock 200.

When many devices in close proximity to each other are transmitting on similar frequencies there is a risk of interference between the signals. Strong signals drown out weaker signals which means that the weaker signals, for example from a corner lock to a hand-held terminal or a crane, have to be retransmitted until the transmitting unit receives a confirmation for he appropriate receiver that the signal has been accurately received. Retransmitting signals reduces the battery life of a unit.

By using a short-range wireless transceiver or transponder 250, the risk of confusing wireless signals and thereby also identities of different container corner locks 200 with each other is minimised, or even eliminated. Furthermore, the power required to transmit over a short-range is low which increases battery life, and, as it reduces interference, the number of retransmissions caused by interfering signals is reduced, thus also extending battery life It is consequently an advantage to use a short-range wireless transceiver or transponder 250 with very short-range, which is greater than or equal to 5 cm and preferably equal to or less than 0.5 metre, more preferably equal to or less than 0.2 metres and even more preferably equal to or less than 10 centimetres, in order not to confuse the identities of the different container corner locks 200. Thereby, also the battery life time of the energy source in the container corner lock 200 is extended.

For this reason, it is also an advantage to use two transceivers 240, 250 or one transceiver 240 and a transponder 250 in the container corner lock 200. The first transceiver 240 for communication with the crane/spreader/operator on a first radio signal frequency having a first distance range in the order of from 10 m to 50 m; and a second short-range transceiver or transponder, for communication with the short-range wireless terminal of the stevedore or similar operator, a second radio signal frequency having a second distance range, which is much shorter than the first distance range of the first transceiver 240.

Furthermore, the container corner lock 200 comprises a processing circuit 260. The processing circuit 260 may be configured to receive the signal from the wireless transceiver 240, interpret the signal and generate a command for operating the electric motor 230 in accordance with the received wireless signal. The processing circuit 260 may also be configured to receive a signal from the short-range wireless transceiver or transponder 250.

Such processing circuit 260 may comprise one or more instances of a processor, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Also, according to some embodiments, the container corner lock 200 may comprise a memory 270. The memory 270 may be configured to store a unique identity reference of the container corner lock 200. Thanks to the unique identity reference, it becomes possible to identify the container corner lock 200 and also associate the container corner lock 200 with the containers it is inserted into. It also becomes possible to store information in the memory 270, and/or in a database, information concerning when service lastly was made on the container corner lock 200. Also, data associated with status such as battery voltage, temperature, etc., and statistics such as e.g. number of openings, software versions, expected battery lifetime left, etc.

Furthermore, the memory 270 in some embodiments. The memory 270 may comprise a physical device utilised to store data or programs, i.e., sequences of instructions, on a temporary or permanent basis. According to some embodiments, the memory 270 may comprise integrated circuits comprising silicon-based transistors. The memory 270 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Furthermore, the container corner lock 200 also may comprise a sensor 280. The sensor 280 may be configured to determine whether at least one of the locking means 215, 225 is situated in open position or locked position, within the corresponding recess 115a, 120a. The sensor 280 may e.g. comprise a light source and a photocell; a bolometer; a position sensor; a capacitive displacement sensor or similar. The sensor 280 may determine whether a locking pin in the container corner lock 200 is set into open position or locked position (and/or whether the locking pin is in an undetermined state, neither opened or locked).

Also, the container corner lock 200 may comprise a power source 290. The power source 290 may be configured to provide electric power to the electric motor 230, the wireless receiver 240, the processing circuit 260, the memory 270, the short-range wireless transceiver 250 or transponder and/or the sensor 280 according to different embodiments. The power source 290 may typically comprise a battery, or a set of batteries.

The power source 290 may in some embodiments comprise a battery that sustains high and low temperatures, having a minimal leakage of current, having enough power to run the electronics, wireless communication via the transceivers 240, 250, and the electric motor 230. Such a battery may be of the type Lithium-Thionyl Chloride (Li—SOCl2) or other type of long life batteries such as Lithium-Sulfur Dioxide (Li—SO2), Lithium Manganese Dioxide (Li—MnO2), etc.

Figure 3A:
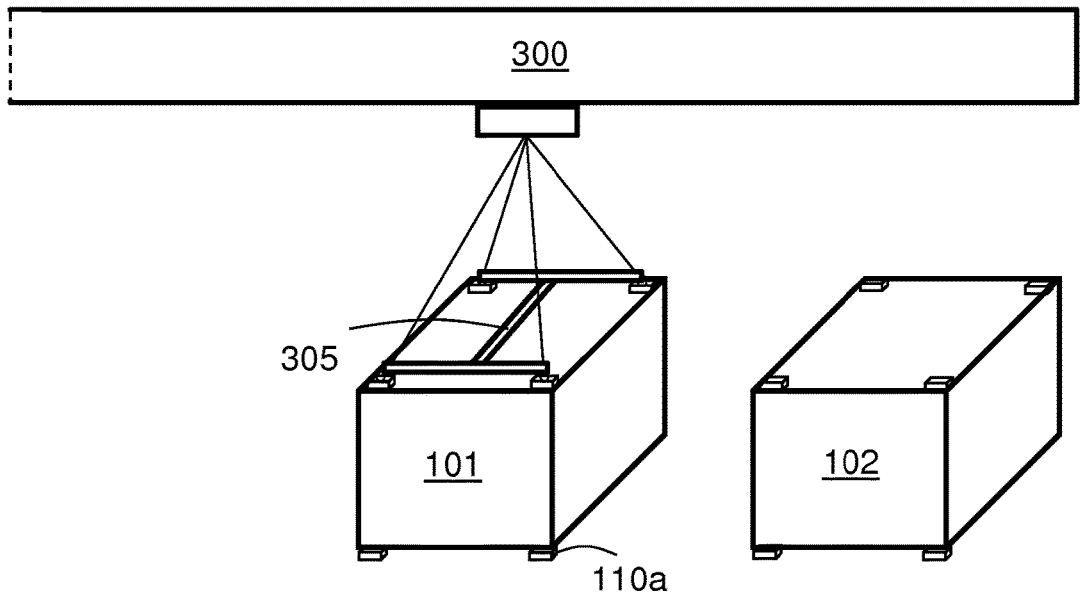
FIG. 3A illustrates a scenario where a first container is lifted and placed on top a second container according to an embodiment of the present invention.
Figure 3B:
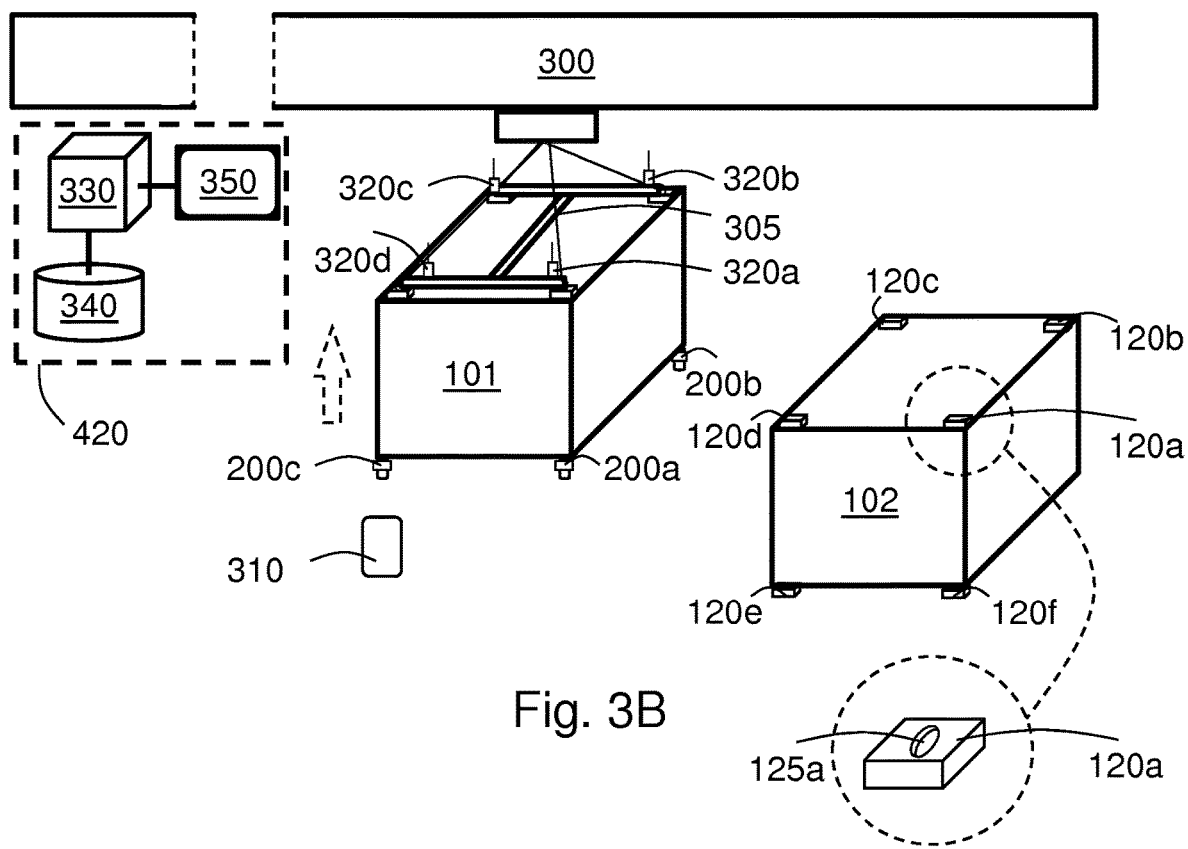
FIG. 3B illustrates a scenario where a first container is lifted and placed on top a second container according to an embodiment of the present invention.
Figure 3C:
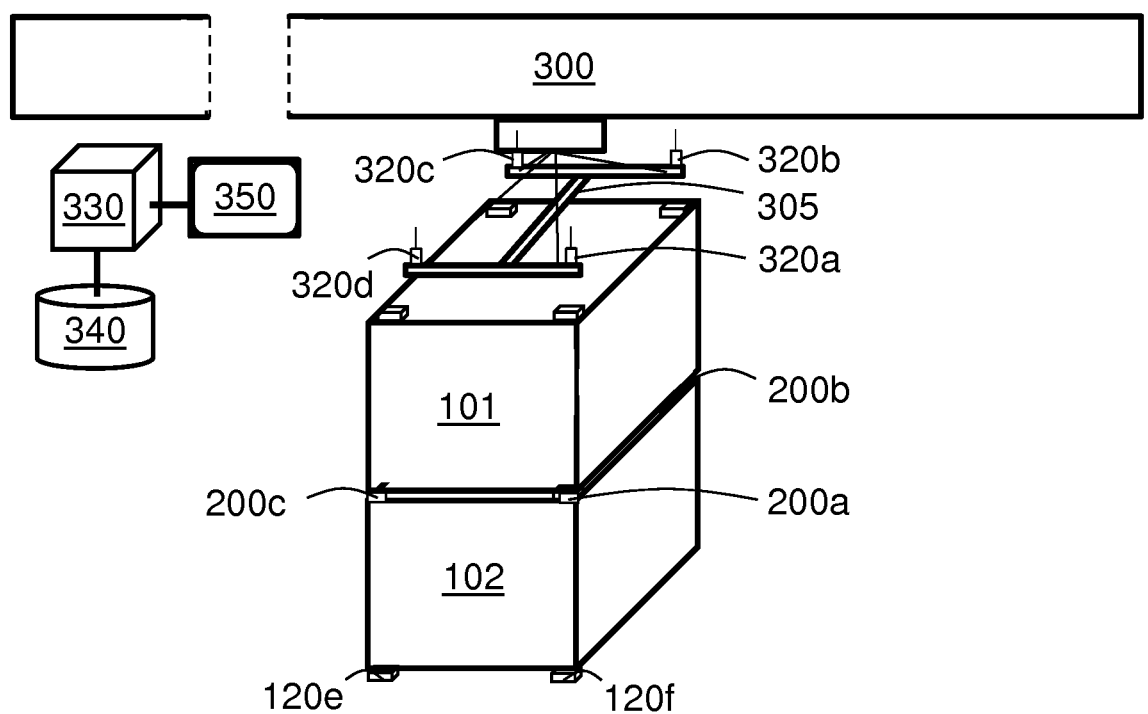
FIG. 3C illustrates a scenario where a first container is lifted and placed on top a second container according to an embodiment of the present invention.

FIG. 3A, FIG. 3B and FIG. 3C schematically illustrate a workflow sequence of loading a first container 101 onto a second container 102, by using a crane 300. In this arbitrary example, only one container 101 is lifted by the crane 300 onto the second container 102. However, in other embodiments, a plurality of stacked containers 101, 102, joint together by container corner locks 200, may be lifted simultaneously.

When the first container 101 is lifted by the crane 300, a stevedore may insert and fix a container corner lock 200 into each corner casting under the first container 101. The stevedore may register each of the container corner locks 200 on a short-range wireless terminal 310. During this process, the container corner lock 200 may be awakened from a sleeping mode into a stand-by mode, thereby being ready to receive radio signals.

The stevedore may rapport the captured identification via the short-range wireless terminal 310 to a Crane Control Unit 420/processor unit 330. The communication between the short-range wireless terminal 310 and the Crane Control Unit 420 may be made e.g. over any of the previously enumerated wireless communication interfaces. However, in some embodiments, the communication alternatively may be made via a wired communication interface.

The Crane Control Unit 420 may comprise a processor unit 330, a database 340 and an output device 350 in some embodiments.

The operator of the crane 300 may then lift the first container 101 onto the second container 102, which may be situated on a vessel.

The crane 300, or a spreader 305 of the crane 300, may comprise a set of transceivers 320a, 320b, 320c, 320d. The transceiver 320a, 320b, 320c, 320d may be referred to as a spreader control unit. The transceiver 320a, 320b, 320c, 320d may comprise a first part, comprising communication means between the application in the crane 300 and the Crane Control Unit 420/processor unit 330. The communication may be made over a wired or wireless communication interface.

Such wireless communication interface may comprise radio communication e.g. on 900 MHz, or corresponding radio signal spectrum (depending on locally allowed radio frequency/ies); or any of the previously enumerated wireless communication interfaces. The first part may thus comprise a radio modem, a source of energy such as a battery, and an external antenna, in some embodiments. However, in embodiments wherein the communication is made over a wired communication interface, the radio modem and antenna are not required. However, in some embodiments, AC power provided from the crane 300 may be used as an energy source.

The second part of the transceiver 320a, 320b, 320c, 320d may comprise means for communication between the container locks 200 and the transceiver 320a, 320b, 320c, 320d. The communication between the transceiver 320a, 320b, 320c, 320d and the respective container corner lock 200 may be made e.g. on a 2.4 GHz radio communication interface.

Each transceiver 320a, 320b, 320c, 320d may communicate with a plurality of container corner locks 200 in some embodiments, in order to enhance reliability.

A tallyman may ask, via a communication interface, which four container corner locks 200 have been registered by the stevedore/short-range wireless terminal 310. These four container corner locks 200 may then be associated with the unique identification code of the first container 101. The tallyman may have a load schedule with all containers 101, 102 to be loaded on the ship. The tallyman may further visually verify that the unique identification code written on the first container 101 correspond the code on the load schedule.

The operator of the crane 300 may then place the first container 101 on top of the second container 102 by inserting the four container corner locks 200 fixed in the four bottom corner castings of the first container 101, into the four top container corner castings 120a, 120b, 120c, 120d.

The tallyman may then give a command, via a wireless communication interface, to lock the four container corner locks 200. A confirmation that all four locks 200 have been successfully locked may be achieved and the tallyman may mark the first container in the load schedule as loaded.

Preferably, to enhance security, the container corner locks 200 are locked/unlocked only when receiving the command via the wireless communication interface from the tallyman/operator, and not in any other way, e.g. by enabling the container corner locks 200 to send wireless signals to each other. Each container corner lock 200 is therefore disabled from communication with any other container corner lock 200, for enhanced security; or to perform any kind of action not initiated by the tallyman/operator.

It may here be mentioned that the herein involved operators, i.e. tallyman, crane operator and stevedore may involve both more operators, and less operators in some embodiments and may be regarded as logical entities rather than physical persons. The tasks of the tallyman may for example be performed by the crane operator, etc. Further, any, some or all of the mentioned operators may be represented by a human, or by an autonomous artificial intelligence. As an example, Optical Character Recognition (OCR) scanning may be used to identify the code of the container 101, 102. Then, an application can connect the four identified container locks 200, which respective identities are received from the short-range terminal 310, with the corresponding container code.

The described process may then be repeated until all containers 101, 102 have been loaded onto the vessel.

When all containers 101, 102 have been loaded on the ship, the load schedule comprising all made associations between container corner locks 200 and containers 101, 102 may be loaded into a file, which may be referred to as a "Baplie". This file may be provided to the next port on the ship route.

The Baplie message is an EDIFACT message, frequently utilised in the shipping industry. It is used by and between various parties to advise the exact stowage positions of the cargo on board of an ocean vessel. It is currently chiefly used for container cargo. Besides the container number and the exact position on board, general information regarding the containers is also specified such as weight and hazardous cargo class, for example.

Figure 4:
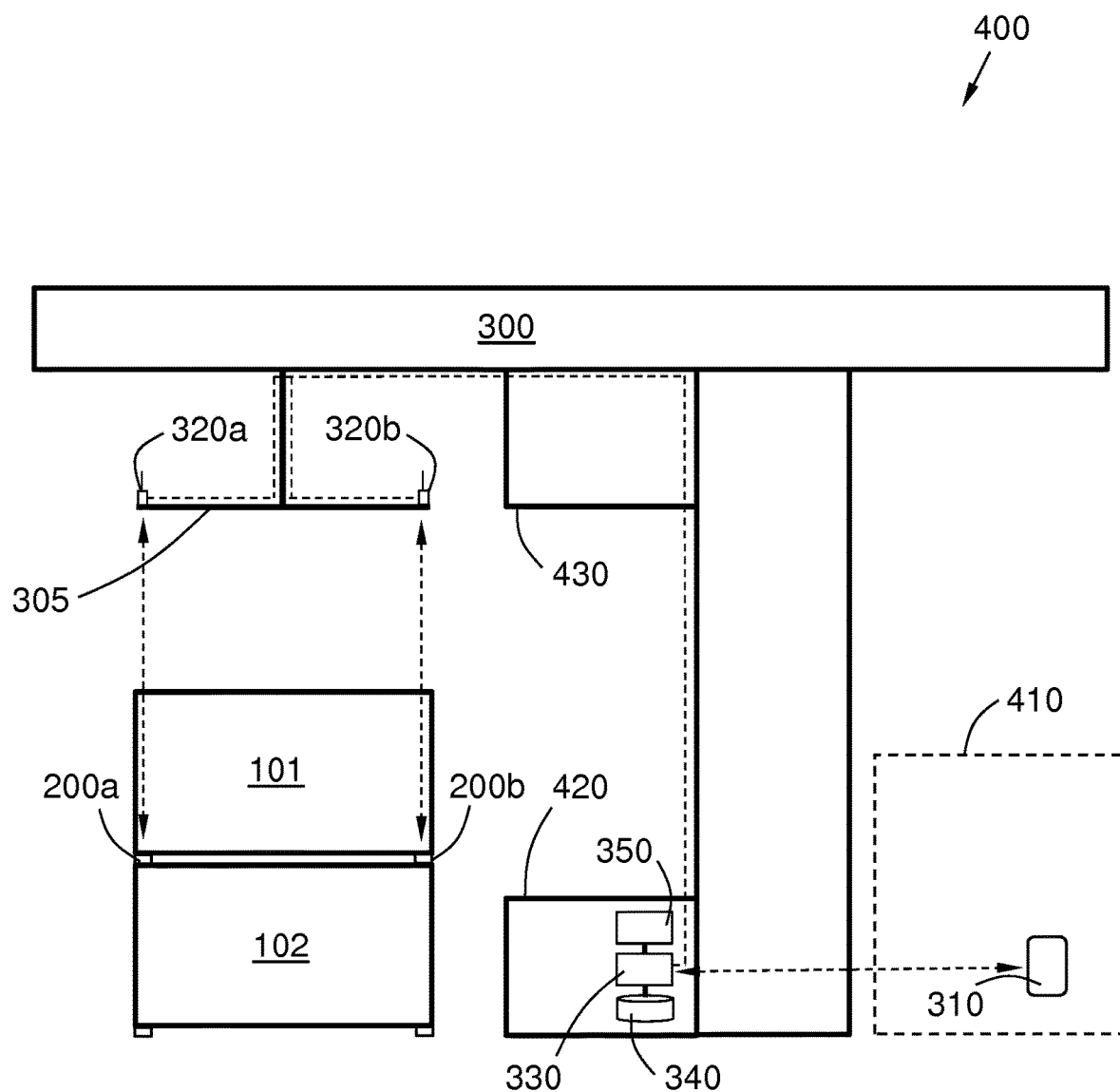
FIG. 4 is an illustration depicting a system according to an embodiment of the present invention.

FIG. 4 illustrates an example of a system 400 for fasten a first container 101, stacked on top of a second container 102, according to an embodiment.

The system 400 may comprise a set of container corner locks 200a, 200b, 200c, 200d which is associated with the first container 101.

The system 400 further may comprise a short-range wireless terminal 310, which is used by a stevedore to determine identity of each respective container corner locks 200a, 200b, 200c, 200d, e.g. by receiving a short distance radio signal from a short-range wireless transceiver or transponder 250 in the container corner lock 200a, 200b, 200c, 200d. The stevedore may in turn send the determined identity reference of the container corner lock 200a, 200b, 200c, 200d, possibly via a Quay Control Unit 410, to a Crane Control Unit 420, over a wired or wireless communication interface. In some embodiments, the Quay Control Unit 410 and the Crane Control Unit 420 may communicate via a 900 MHz radio link.

Crane Control Unit 420 may be controlled by the tallyman, who supervises the process operation of loading/unloading, and locking/unlocking the containers 101, 102. The Crane Control Unit 420 may comprise a processor 330, a database 340 and an output device 350. The database 340 is configured to store obtained information related to the set of container corner locks 200a, 200b, 200c, 200d. The output unit 350 may be configured to output information related to the set of container corner locks 200a, 200b, 200c, 200d to the tallyman or other operator such as the operator of the crane 300. The output unit 350 may comprise a display, a laptop, a computer tablet, a projector, a head-up display, a portable device of the operator, intelligent glasses of the operator, etc. The Crane Control Unit 420 may be represented by a stationary or portable computer or similar device.

Further, the system 400 also comprises at least one transceiver 320a, 320b, 320c, 320d, which transceiver 320a, 320b, 320c, 320d is configured to communicate wireless signals with the respective transceivers 240 of the set of container corner locks 200a, 200b, 200c, 200d.

The Crane Control Unit 420/processing unit 330 is configured to interpret wireless signals obtained from the set of container corner locks 200a, 200b, 200c, 200d via the transceiver 320a, 320b, 320c, 320d, into information.

When unloading the containers 101, 102 from the vessel to the quay, upon arriving at the destination port, the following methodology may be applied in some embodiments.

The load schedule comprising associations of container/container corner locks 200a, 200b, 200c, 200d may be extracted, e.g. from the Baplie file. The tallyman may mark the specific container 101 the operator of the crane 300 is to lift according to the load schedule. The crane operator may grab the container 101 to be lifted.

The tallyman may then provide a command via the crane control unit 420 to unlock the four container corner locks 200a, 200b, 200c, 200d associated with the first container 101, previously marked. A confirmation that the container corner locks 200a, 200b, 200c, 200d are unlocked may be obtained in some embodiments. The tallyman may then inform the crane operator that the first container 101 is ready to be lifted, e.g. via a visual signal, audit signal, haptic signal, etc., and/or a combination thereof. For example, a diode or light may shift from red to green, etc.

In some other embodiments, the lock and unlock command can be sent from the crane control unit 420/processor 330 to the four container corner locks 200a, 200b, etc., automatically when the spreader 305 of the crane 300 grabs the container 101 to be lifted. This may involve a logical interface of the crane control unit 420/control unit 330 and the crane operating system.

The crane operator may then lift the first container from the vessel to the quay. The stevedore may remove the four container corner locks 200a, 200b, 200c, 200d underneath the first container 101 while the container 101 is still hold in the air above the quay. When the first container 101 is placed in the correct, expected position, the tallyman may register the first container 101 as unloaded on the quay by marking it in the output unit 350/crane control unit 420.

The container corner locks 200a, 200b, 200c, 200d associated with the first container 101 may be de-associated with the first container 101, and then put into sleep mode. An advantage by putting the container corner locks 200a, 200b, 200c, 200d into sleep mode is that battery lifetime of the power source 290 in each respective container corner lock 200a, 200b, 200c, 200d, is extended. Also, the risk of signalling interference between signalling container 35 corner locks 200a, 200b, 200c, 200d of the vessel is reduced by pacifying container corner locks 200a, 200b, 200c, 200d which are not in active use.

In some embodiments, also container corner locks 200a, 200b, 200c, 200d which are considered defect; having battery power below a threshold limit, etc., may be put aside for further investigation and maintenance. It is thereby avoided that defect container corner locks 200a, 200b, 200c, 200d are used, which reduces accidents.

The removed container corner locks 200a, 200b, 200c, 200d may in some embodiments be inspected with respect to maintenance and service. A check may be made e.g. in a memory 270 of each respective container corner lock 200a, 200b, 200c, 200d; or alternatively in a database 340 configured to store obtained information related to the set of container corner locks 200a, 200b, 200c, 200d, e.g. concerning last time service was made of the respective container corner locks 200a, 200b, 200c, 200d. A comparison may be made with a minimum threshold time for performing service, such as e.g. two years, three years, four years, five years, seven years etc. (or a subset/or multiple thereof), and container corner locks 200a, 200b, 200c, 200d exceeding the predetermined minimum threshold time may be put aside for service and maintenance. Other, approved container corner locks 200a, 200b, 200c, 200d may be reused, e.g. on another container/vessel.

It is thereby assured that service and maintenance of container corner locks 200a, 200b, 200c, 200d is performed regularly at or within predetermined time intervals, also when the container corner locks 200a, 200b, 200c, 200d arrives from another destination/shipping line. Thereby security is enhanced.

An advantage with the disclosed system 400 is that no installation, equipment or personnel on-board the ship is required. All installations and personnel are working on the quay. This is an important security aspect, as the same personnel on the quay that are experienced in loading/off-loading are enabled to make all the loading, without interaction and potential problems due to language/cultural misinterpretations and conflicts with the personnel onboard.

Figure 5:
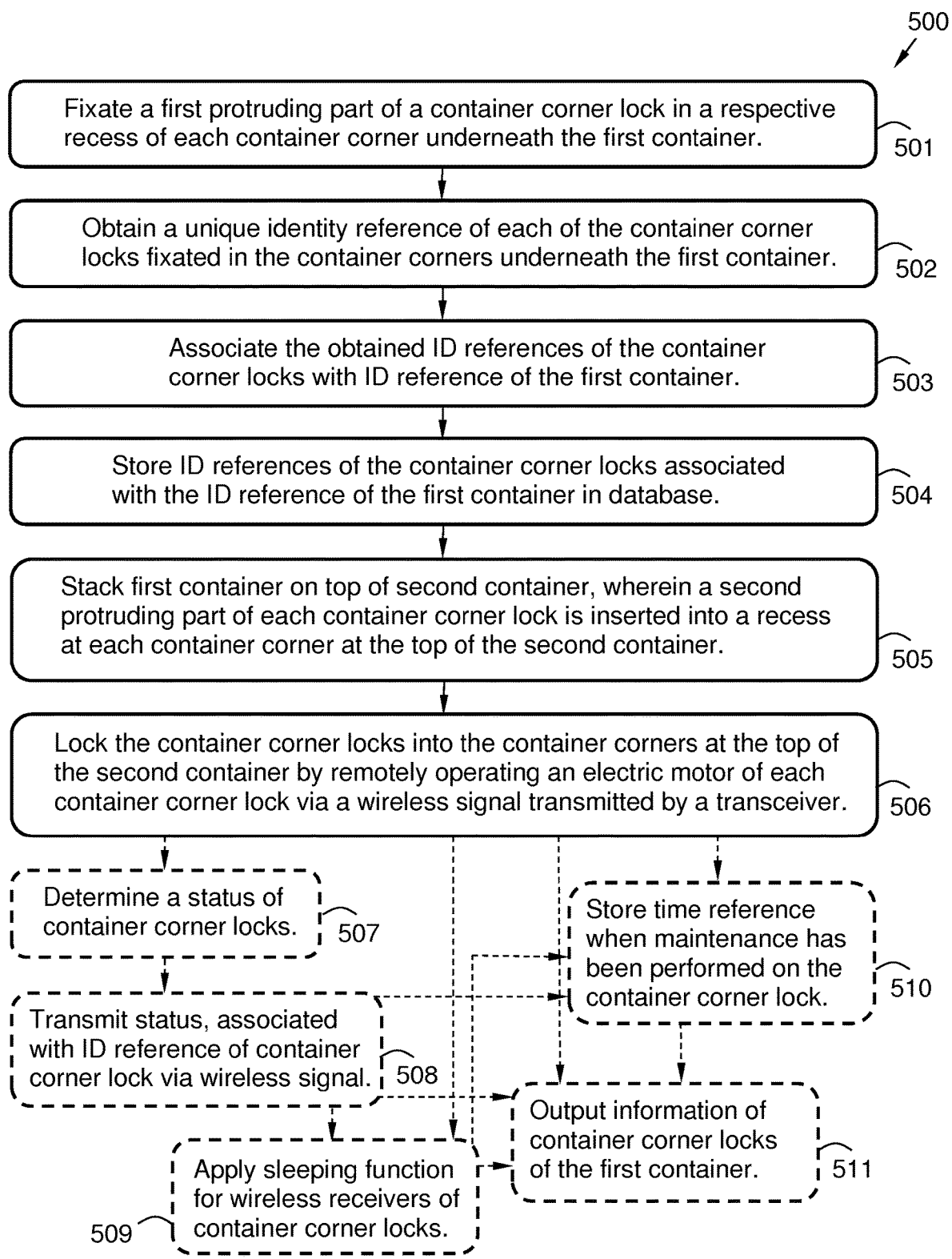
FIG. 5 is a flow chart illustrating an embodiment of a method of the present invention.

FIG. 5 illustrates an example of a method 500 according to an embodiment. The flow chart in FIG. 5 shows the method 500, for stacking and fastening a first container 101 on top of a second container 102. The containers 101, 102 may be transported e.g. from a quay to a vessel, or vice versa.

In order to correctly be able to stack and fasten the containers, the method 500 may comprise a number of steps 501-511. However, some of these steps 501-511 may be performed in a somewhat different chronological order than the numbering suggests. Step 502 may be performed before step 501 for example in some embodiments. Some steps of the method 500 may be performed only in some alternative embodiments, such as e.g. method steps 507-511. The method 500 may comprise the subsequent steps:

Step 501 comprises fixing a first protruding part 210 of a container corner lock 200a, 200b, 200c, 200d, as previously described, in a respective recess 115a of each container corner castings 110a, 110b, 110c, 110d, underneath the first container 101.

The respective first protruding part 210 of each container corner lock 200a, 200b, 200c, 200d may comprise a first locking means 215, configured for manual locking for fixing the first protruding part 210 into the first recess 115a.

The container corner lock 200a, 200b, 200c, 200d may thereby be placed and manually locked into the corresponding container corner casting 110a, 110b, 110c, 110d, by a stevedore on the quay, when the first container 101 is lifted up by a crane 300.

Step 502 comprises obtaining a unique identity reference of each of the container corner locks 200a, 200b, 200c, 200d fixed 501 in the container corner castings 110a, 110b, 110c, 110d underneath the first container 101.

In some embodiments, the step of obtaining the unique identity reference may comprise wakening up the of the container corner locks 200a, 200b, 200c, 200d via a wireless communication interface.

By putting the container corner locks 200a, 200b, 200c, 200d into a passive sleep mode, energy is saved, which extends the life time of the respective energy source of the container corner locks 200a, 200b, 200c, 200d. By wakening them up, energy is spent only when required.

Step 503 comprises associating the obtained 502 unique identity references of the container corner locks 200a, 200b, 200c, 200d with a unique identity reference of the first container 101.

It is thereby assured which container corner locks 200a, 200b, 200c, 200d that are put into which container 101, 102. The risk of confusing container corner locks 200a, 200b, 200c, 200d with each other is thereby reduced or minimised.

Step 504 comprises storing the obtained 502 unique identity references of the container corner locks 200a, 200b, 200c, 200d associated 503 with the unique identity reference of the first container 101 in a database 340.

By storing the obtained 502 unique identity references of the container corner locks 200a, 200b, 200c, 200d, associated 503 with the unique identity reference of the first container 101 in the database 340, it will be possible for the operators to unload the first container 101 by opening/releasing the container corner locks 200a, 200b, 200c, 200d when arriving at the destination.

It is important to only unlock the intended container corner locks 200a, 200b, 200c, 200d, associated with the container 101, 102 to be unloaded, and no other container corner locks; otherwise a severe accident may occur. By notifying and storing the identities of the container corner locks 200a, 200b, 200c, 200d, associated with the identity of the container in the database, this risk is omitted, or at least minimised.

Step 505 comprises stacking the first container 101 on top of the second container 102, wherein a second protruding part 220 of each respective container corner lock 200a, 200b, 200c, 200d is inserted into a respective recess 125a at each container corner castings 120a, 120b, 120c, 120d at the top of the second container 102.

Step 506 comprises locking the container corner locks 200a, 200b, 200c, 200d into the container corner castings 120a, 120b, 120c, 120d at the top of the second container 102 by remotely operating an electric motor 230 of each container corner lock 200a, 200b, 200c, 200d via a wireless signal transmitted by an operator, from a processor 330 via a transceiver 320a, 320b, 320c, 320d.

In some embodiments, wherein the second locking means 225 comprises a spring-loaded mechanism, the locking of the container corner locks 200a, 200b, 200c, 200d into the container corner castings 120a, 120b, 120c, 120d may be made by inserting the respective second protruding part 220 of the container corner castings 120a, 120b, 120c, 120d into the second recess 125a of the second container corner casting 120a of the second container 102.

The second locking means 225 may comprise a self-locking spring-loaded mechanism in some embodiments.

Thereafter, the respective electric motor 230 of each container corner lock 200a, 200b, 200c, 200d may act on a locking pin 235, setting the second locking means 225 into locked position, upon a wirelessly sent command from the operator.

Step 507 which may be performed only in some alternative embodiments, may comprise determining a status of the respective container corner locks 200a, 200b, 200c, 200d.

The status of the respective container corner lock 200a, 200b, 200c, 200d may be determined by a respective sensor 280 configured to determine whether at least one of the locking means 215, 225 is situated in open position or locked position, within the corresponding recess 115a, 125a of the respective container corner castings 110a, 110b, 110c, 110d, 120a, 120b, 120c, 120d.

Thereby, a malfunctioning container corner lock 200a, 200b, 200c, 200d may be spotted and exchanged, thereby avoiding an accident.

Step 508 which may be performed only in some alternative embodiments wherein step 507 has been performed, may comprise transmitting the determined 507 status, associated with the unique identity reference of the container corner lock 200a, 200b, 200c, 200d via a wireless signal.

Step 509 which may be performed only in some alternative embodiments, may comprise applying a sleeping function for deactivating the wireless receiver 240 of each of the container corner locks 200a, 200b, 200c, 200d for a period of time.

By enabling the container corner locks 200a, 200b, 200c, 200d to sleep, and thereby alternate between active mode and sleeping mode, battery capacity of the power source 290 is saved, thereby prolonging battery life time.

Step 510 which may be performed only in some alternative embodiments, may comprise storing a time reference to a time period when service/maintenance has been performed on the container corner lock 200a, 200b, 200c, 200d in a memory 270 of the container corner 30 lock 200a, 200b, 200c, 200d.

Also, other information associated with the service/maintenance may be stored in the respective memory 270, such as where and by whom service was performed.

Step 511 which may be performed only in some alternative embodiments, may comprise outputting information concerning unique identity references of container corner locks 200a, 200b, 200c, 200d associated with the unique identity reference of the first container 101.

In some embodiments, the outputted information further comprises the determined 507 status of the respective container corner lock 200a, 200b, 200c, 200d.

The information may be output on the output unit 350, to the operator.

The terminology used in the description of the embodiments as illustrated in the accompanying drawings is not intended to be limiting of the described method 500; the container corner lock 200 and/or system 400. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

We claim:

1. A container corner lock for fastening a first container corner casting of a first container and a corresponding second container corner casting of a second container, wherein the first container is stacked on the second container; wherein the container corner lock comprises:
   a first protruding part, configured to be inserted into a first recess of the first container corner casting of the first container; wherein the first protruding part comprises a first locking means for fixing the first protruding part into the first recess;
   a second protruding part, configured to be inserted into a second recess of the second container corner casting of the second container; wherein the second protruding part comprises a second locking means for fixing the second protruding part into the second recess;
   an electric motor configured to block or unblock the movement of at least one of the locking means between an open position and a locked position within the corresponding recess;
   a first wireless transceiver configured for communication with an external transceiver on a first radio signal frequency having a first distance range;
   a processing circuit configured to receive the signal from the first wireless transceiver, interpret the signal and generate a command for operating the electric motor in accordance with the received wireless signal;

a second, short-range wireless transceiver or transponder configured to communicate with an external short-range terminal on a second radio signal frequency having a second distance range, which is shorter than the first distance range of the first transceiver, wherein the processing circuit receives a signal from the short-range wireless transceiver or transponder.

2. The container corner lock according to claim 1, wherein said second distance range is a very short-range which is equal to or less than 5 centimeters.

3. The container corner lock according to claim 1, wherein:
the first locking means of the first protruding part is configured for manual locking for fixing the first protruding part into the first recess; and
the electric motor is configured to relocate the second locking means of the second protruding part for fixing the second protruding part into the second recess.

4. The container corner lock according to claim 1, wherein:
the second locking means comprises a spring-loaded mechanism, fixing the second protruding part of the container corner lock into the second container corner casting when inserted into the second recess of the second container corner casting of the second container.

5. The container corner lock according to claim 1, further comprising:
a memory configured to store a unique identity reference of the container corner lock; wherein said short-range wireless transceiver or transponder is configured to provide the unique identity reference to a short-range wireless terminal upon request.

6. The container corner lock according to claim 1, further comprising:
a sensor configured to determine whether at least one of the locking means is situated in open position or locked position, within the corresponding recess.

7. The container corner lock according to claim 1, wherein the processing circuit is further configured to apply a sleeping function for deactivating the wireless transceiver for a period of time.

8. The container corner lock according to claim 1, further comprising: a power source configured to provide electric power to the electric motor, the wireless transceiver, the processing circuit and/or the memory and the short-range wireless transceiver or transponder and/or the sensor.

9. The container corner lock according to claim 1, wherein said second short-range wireless transceiver or transponder communicates via Near Field Communication (NFC) (13.56 MHz), or any other Wireless Personal Area Networks (WPANs) such as Wi-Fi, Wireless Local Area Network (WLAN) or Ultra Mobile Broadband (UMB) or Bluetooth (BT) or Radio-Frequency Identification (RFID) or Z-wave or ZigBee or IPv6 over Low power Wireless Personal Area Networks (6LoWPAN) or Wireless Highway Addressable Remote Transducer (HART) Protocol or Wireless Universal Serial Bus (USB).

10. A system for fastening a first container, stacked on top of a second container; which system comprises:
a set of container corner locks according to claim 1, associated with the first container;
at least one transceiver, which transceiver is configured to communicate wireless signals with the respective first transceivers of the set of container corner locks;
a processing unit, configured to interpret wireless signals obtained from the set of container corner locks via the transceiver, into information;
a database configured to store obtained information related to the set of container corner locks; and
an output unit configured to output information related to the set of container corner locks to an operator.

11. The system of claim 10, further comprising:
a short-range wireless terminal configured to communicate wirelessly with a short-range wireless transceiver or transponder of each respective container corner lock in the set of container corner locks; and configured to obtain a unique identity reference of the respective container corner locks from the respective short-range wireless transceivers (250) or transponders of the container corner locks in the set; and also configured to provide the obtained unique identity references of the container corner locks in the set, to the database, associated with at least one container.

12. A method for stacking and fastening a first container on top of a second container; which method comprises the steps of:
fixing a first protruding part of a container corner lock according to claim 1 in a respective recess of each container corner casting underneath the first container;
obtaining a unique identity reference of each of the container corner locks fixed in the container corner castings underneath the first container from the short-range wireless transceiver or transponder of each respective container corner lock of the set of container corner locks;
associating the obtained unique identity references of the container corner locks with a unique identity reference of the first container;
storing the obtained unique identity references of the container corner locks associated with the unique identity reference of the first container in a database;
stacking the first container on top of the second container, wherein a second protruding part of each respective container corner lock is inserted into a respective recess at each container corner casting at the top of the second container;
locking the container corner locks into the container corner castings at the top of the second container by remotely operating an electric motor of each container corner lock via a wireless signal transmitted via a transceiver and received by said respective first transceivers of the set of container corner locks.

13. The method according to claim 12, further comprising:
determining a status of the respective container corner locks; and
transmitting the determined status, associated with the unique identity reference of the container corner lock via a wireless signal to a processor of the short-range terminal.

14. The method according to claim 12, further comprising:
applying a sleeping function for deactivating the wireless transceiver of each of the container corner locks for a period of time.

15. The method according to claim 12, further comprising:
outputting information concerning unique identity references of container corner locks associated with the unique identity reference of the first container.

16. The method according to claim 15, further comprising:
- determining a status of the respective container corner locks; and
- transmitting the determined status, associated with the unique identity reference of the container corner lock via a wireless signal to the processor;
- wherein the outputted information further comprises the determined status of the respective container corner lock.

17. The method according to claim 12, further comprising storing a time reference to a time period when maintenance has been performed on the container corner lock in a memory of the container corner lock.

* * * * *